United States Patent [19]

Ateya

[11] Patent Number: 4,802,887

[45] Date of Patent: Feb. 7, 1989

[54] COMPOSITIONS COMPRISING A WATER-SOLUBLE METAL COMPLEX DYE, AN OXYALKLATED AMINE SULPHATE ESTER AND A DISPERSING AGENT

[75] Inventor: Kamal Ateya, Binningen, Switzerland

[73] Assignee: Sandoz Ltd., Basel, Switzerland

[21] Appl. No.: 24,287

[22] Filed: Mar. 10, 1987

Related U.S. Application Data

[63] Continuation of Ser. No. 879,242, Jun. 26, 1986, abandoned.

[30] Foreign Application Priority Data

Jun. 27, 1985 [DE] Fed. Rep. of Germany ....... 3522981

[51] Int. Cl.$^4$ .................. C09B 67/24; D06P 1/39; D06P 3/32
[52] U.S. Cl. ........................... 8/524; 8/527; 8/557; 8/588; 8/591; 8/680; 8/681; 8/685
[58] Field of Search .............. 8/524, 527, 587, 680, 8/681, 685, 591

[56] References Cited

U.S. PATENT DOCUMENTS 4,444,564 4/1984 Salathe et al. .................. 8/588

FOREIGN PATENT DOCUMENTS 898499 6/1962 United Kingdom .
1143090 2/1969 United Kingdom .
1375209 11/1974 United Kingdom .
1425237 2/1976 United Kingdom .
2168364 6/1986 United Kingdom .

*Primary Examiner*—A. Lionel Clingman
*Attorney, Agent, or Firm*—Gerald D. Sharkin; Richard E. Vila; Joanne M. Giesser

[57] ABSTRACT

A composition comprising:
(a) 30 to 90% by weight of one or more water soluble anionic dyestuffs in metal complex form,
(b) 0.5 to 20% by weight of one or more compounds of formula I

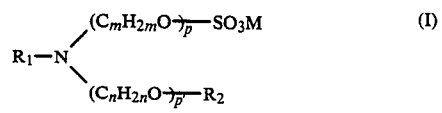

in which $R_1$ is $C_{12-22}$alkyl or $C_{12-22}$alkenyl;
$R_2$ is hydrogen or $-SO_3M$;
m is 2, 3 or 4;
n is 2, 3 or 4;
p+p' is 10 to 30 inclusive, each of p and p' being at least 1; and M is a cation; and
(c) 5 to 40% by weight of a dispersing agent.

These compositions are suitable for dyeing of textile and leather substrates.

24 Claims, No Drawings

COMPOSITIONS COMPRISING A WATER-SOLUBLE METAL COMPLEX DYE, AN OXYALKLATED AMINE SULPHATE ESTER AND A DISPERSING AGENT

This is a continuation of application Ser. No. 879,242, filed June 26, 1986, now abandoned.

The invention relates to compositions of water-soluble anionic metal complex dyes in liquid form or in the form of a powder or as granules. These compositions form stable solutions in the dyebath and in powder form they are easily flowable, easily wettable and sprinkle easily.

With the increasing automation of dyeing procedures, it has become more and more important for dye preparations to be stable in the dyebath so that dyeings can be made that are easily reproducible with minimum supervision. It is also important for the dyes to be in such a form that they are readily soluble.

There is provided, therefore, according to the invention, a composition comprising:

(a) 30 to 90 % by weight of one or more water soluble anionic dyestuffs in metal complex form (hereinafter referred to as component a));

(b) 0.05 to 20 % by weight of one or more compounds of formula I $$R_1-N\begin{cases}(C_mH_{2m}O)_{\overline{p}}-SO_3M \\ (C_nH_{2n}O)_{\overline{p'}}-R_2\end{cases} \quad (I)$$

in which $R_1$ is $C_{12-22}$alkyl or $C_{12-22}$alkenyl;
$R_2$ is hydrogen or $-SO_3M$;
m is 2, 3 or 4;
n is 2, 3 or 4;
p +p' is 10 to 30 inclusive, each of p and p' being at least 1; and M is a cation; (hereinafter referred to as component b) and (c) 5 to 40 % by weight of a dispersing agent (hereinafter referred to as component c).

Preferably 0.1 to 30 % of one more additional components selected from a wetting agent, a sequestering agent, a defoamer and a dust suppressing agent (hereinafter referred to as component d) are also present.

In this Specification all percentages are by dry weight of the total composition, unless indicated to the contrary.

Preferably up to 400 % water can be added to the composition to form a presscake or liquid preparation.

For the avoidance of doubt, where a symbol appears more than once in a formula its significances are independent of one another. In particular when the group $$+C_mH_{2m}-O)_{\overline{p}} \text{ or } +C_nH_{2n}-O)_{\overline{p'}}$$

appears, the significances of m or n respectively, in the chain can be such that ethyleneoxide, propyleneoxide and/or butyleneoxide units may occur in the same chain. Further, where a substituent is capable of being linear or branched it is linear or branched unless indicated to the contrary.

M is preferably ammonium or an alkali or alkaline earth metal ion, more preferably M is ammonium or an alkali metal ion.

Preferably component a) is a metal complex azo dyestuff with only one water soluble group present.

Preferably $R_1$ is $C_{18-22}$alkyl or $C_{18-22}$alkenyl.

The compounds of formula I used in the compositions according to the invention are known or can be produced by known methods from known compounds, e.g. as disclosed in British Patent Application No. 2,168,364, the disclosure of which is incorporated herein by reference.

The dispersing agents used in the compositions according to the invention are those which are generally suitable for use in aqueous systems. Preferred dispersing agents are, for example, the commercial condensation products of ditolylether sulphonate and formaldehyde, naphthalene sulphonic acid and formaldehyde or are a lignin sulphonate or an oxylignin sulphonate.

The defoamers that may be used in the compositions according to the invention are for example organosilicon compounds or triisobutyl phosphate. The sequestering agents that may be used in the compositions according to the invention are for example gluconates and phosphates. The wetting agents that may be used in the compositions of the invention are for example tributoxyethyl phosphate or compounds and mixtures which are described in Belgian Pat. No. 671,100 the content of which is incorporated herein by reference, and the dust suppressing agents (only for powder preparations) that may be used in compositions according to the invention are for example emulsified paraffin oils. Preferred compositions according to the invention are those comprising:

(a) 50 to 80 percent by weight of one or more 1:2-chromium-, -cobalt- or -nickel complex azo dyes.

(b) 2 to 10 percent by weight of a compound of formula I, in which $R_1$ is $C_{18-22}$alkyl or $C_{18-22}$alkenyl, $R_2$ signifies a radical of formula $-SO_3M$, M is an ammonium ion, the sum of p+p' is 15 to 25 and m and n respectively are 2; and (c) 10 to 30 percent by weight of dispersing agent.

Compositions according to the invention can be prepared by dissolving components b) and c) in water, and then adding component a) (generally in the form of a presscake) and then grinding the mixture (generally in a pearl mill) and removing the water (generally by spray-drying, drying using known heating methods, atomisation or fluidization) or diluting the mixture with water to give the desired dyestuff concentration. Component d) if present, can be added to components b) and c) in water prior to addition of component a).

Compositions according to the invention may also be prepared using a dry dyestuff presscake. This presscake is prepared by milling and mixing the dyestuff by known methods and the composition is then made by dissolving the coupage components (components b, c and optionally d) in water, adding the dry presscake, drying the resulting suspension and milling by known methods.

Grinding generally takes place for 2 to 8 hours, preferably 4 to 6 hours. The size of the particles produced is about 99 % <12 μ, 90 % <8 μm, and the average diameter is about 5.5 to 6 μm. The salt content of the compositions of the invention so produced is preferably NaCl 1.5 to 8.5 and Na$_2$SO$_4$ 5.1 to 9.0 percent by weight; the total salt content being up to 15.5 percent. A total salt content of up to 15.5 % does not have any appreciable effect on the properties of the compositions of the invention. Solubility properties and stability in the dyebath are not adversely affected by the quality of the water in which the preparations are dissolved, the buffers and further dyeing auxiliaries in the dyebath.

The compositions according to the invention have a viscosity preferably in the range 2000 to 6000 cP inclusive, more preferably 3000 to 4000 cP inclusive.

The compositions according to the invention are suitable for dyeing textile and leather. The application of the compositions according to the invention to textile and leather substrates can be carried out according to known methods, for example as described in British Patent Application No. 2,168,364.

In the following Examples, all parts and percentages are by weight.

EXAMPLE 1

13 Parts of a commercial dispersing agent (the condensation product of ditolylether sulphonate and formaldehyde)

6 Parts of the compound of formula I, wherein $R_1$ is a mixture of stearyl, behenyl and arachidyl radicals, $R_2$ is a $SO_3NH_4$ group, M is $-NH^{\oplus}_4$, m and n each signify 2 and the sum of $p+p'$ is 20, 3 Parts of sodium hexametaphosphate (sequestering agent) and 3 Parts of a commercial, anion-active wetting agent (a sulphonate of an aliphatic ester) are dissolved in 400 parts of water.

Then 75 parts of a dry presscake of C.I. Acid Violet 128 are added, the mixture is stirred for half an hour, then ground in a pearl mill for 6 hours and dried in a fluidized bed granulator. The size of the dyestuff particles prior to drying is on average 5.7 μm.

The product thus obtained has excellent solubility both in cold and hot water, and can be wetted and sprinkled very easily and is easily flowable. It is stable in a dyebath, in the presence of hard water, electrolytes, anionic, non-ionic and cationic bath additives, and is eminently suitable for dyeing textiles and leather.

Similar results are obtained when the foregoing is repeated using, instead of C.I. Acid Violet 128, the dyestuff of the formula

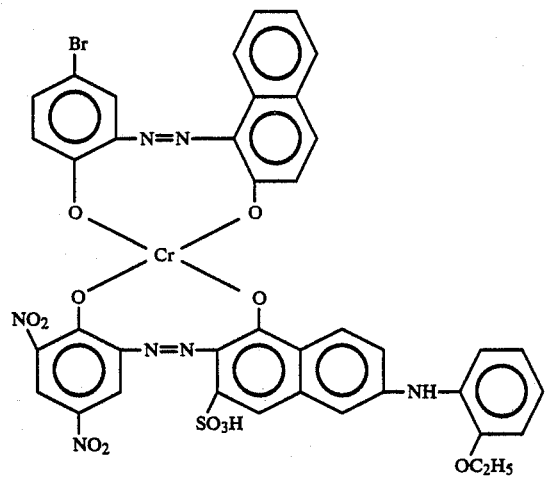

EXAMPLE 2

The following substances are processed according to the method of Example 1 in 300 parts of water and with wet grinding for 4 hours;

20 Parts of the dispersing agent of Example 1 (condensation product of ditolylether sulphonate/formaldehyde);

10 Parts of the compound of formula I, as defined in Example 1,

5 Parts of sodium hexametaphosphate;

5 Parts of the wetting agent defined in Example 1;

5 Parts of urea;

0.5 Parts of silicone-free anti-foaming agent (Antimussol HTS); and 54.5 Parts of the dry presscake of C.I. Acid Blue 296.

The preparation obtained contains 1.6 % NaCl and 9.0 % $Na_2SO_4$. The diameter of the dyestuff particles prior to drying is on average 5.77 μm. The quality of the preparation corresponds to that of the product of Example 1.

EXAMPLE 3

According to the process of Example 1;

11.8 Parts of the sodium salt of dinaphthylmethane disulphonic acid;

10.7 Parts of a commercially dispersing agent (Reax-81 based on lignin sulphonate);

3.0 Parts of urea;

2.0 Parts of sodium gluconate (sequestering agent)

3.0 Parts of an anionic wetting agent (sulphonate of an aliphatic ester); and

9 Parts of the compound of formula I defined in Example 1 are dissolved in 400 parts of water and added to 60.5 parts of a dry presscake of C.I. Acid Red 399.

The product is then treated according to Example 1 and a preparation having similar properties to that of Example 1 results.

EXAMPLE 4

According to the process of Example 1, the following are mixed in 400 parts of water:

18 Parts of a commercially available dispersing agent (Reax 85 - a lignin sulphonate);

4.5 Parts of a commercially available anionic wetting agent 2.5 Parts of sodium gluconate;

0.1 Parts of a defoaming agent (Rodorsil 424 RDL);

72 Parts of a dry presscake of C.I. Acid Black 222 and 3 Parts of a compound of formula I defined in Example 1.

The resulting dyestuff preparation is of the same quality as that of Example 1.

EXAMPLE 5

21 Parts of ditolylether/formaldehyde condensate;

8 Parts of the compound of formula I defined in Example 1;

5 Parts of a commercially available anionic wetting agent; and 0.7 Parts of commercially available defoaming agent (Antimussol HTS)

dissolved in 400 parts of water are added to 65.3 parts of a dry presscake of C.I. Acid Orange 168, milled in a "Polytron" (Rotorstator System) for 1 hour and spray dried.

The quality of the resulting product is similar to that of Example 1.

EXAMPLES 6 to 10

Instead of wet grinding the suspensions of Examples 1 to 5, these suspensions (Examples 6 to 10) can be dried and the dry preparations can be dry ground.

The average size of the resulting particles is 3 to 5 μm and individual particles may be up to 25 μm in diameter.

EXAMPLE 11

The coupage compounds of Example 4 are mixed with the presscake of Example 4 that has been ground in a pin mill for 30 minutes and the mixture is then homogenised in a Tubular mixer. The quality of the resulting preparation is similar to that of Example 1. The amounts used are the same as those given in Example 4.

EXAMPLE 12

The process of Example 1 is repeated, using instead of the compound of formula I defined in that Example, the same amount of a compound of formula I in which $R_1$ is oleyl, $R_2$ is $-SO_3NH_4$, $p+p'$ is 16 and $m+n$ is 2.

The resulting preparation is of a similar quality to that of Example 1.

EXAMPLE 13

The process of Example 1 is repeated, using instead of the compound of formula I defined in that Example the same amount of a compound of formula I in which $R_1$ is a mixture of $C_{14-18}$alkyl groups, $R_2$ is hydrogen, the groups $C_mH_{2m}O$ and $C_nH_{2n}O$ case a mixture of ethoxy, propoxy and butoxy, the sum of $p+p'$ is 24, M is Na-⊕ and instead of the dyestuff in Example 1, 75 parts of a dry presscake of C.I. Acid Brown 298 are used.

EXAMPLES 14 to 15

The process of Example 1 is repeated using instead of the compound of formula I defined in Example 1 the same amount of the compound of formula I in which $R_1$ is a mixture of $C_{12-18}$alkyl (Example 14) and $C_{14-18}$alkylene groups (Example 15), m, n, M and $R_2$ are as defined in Example 1 and $p+p'$ is 18 and instead of the dyestuff of Example 1, 100 parts of a dry presscake of C.I. Acid Yellow 239 are used. A preparation results that is very stable in a dyeing bath.

EXAMPLES 16 to 18

The process of Example 1 is repeated using instead of the dyestuff of Example 1, the same amount of C.I. Acid Black 218 (Example 16), C.I. Acid Brown 259 (Example 17) and C.I. Acid Green 106 (Example 18).

The resulting dyestuff preparations are preparations that are exceptionally stable in dyeing baths.

What is claimed is:

1. A composition comprising:
   (a) 30 to 90 % by weight of one or more water soluble anionic dyestuffs in metal complex form,
   (b) 0.5 to 20 % by weight of one or more compounds of formula I $$R_1-N\begin{matrix}(C_mH_{2m}O)_p-SO_3M\\(C_nH_{2n}O)_{p'}-R_2\end{matrix} \quad (I)$$

in which $R_1$ is $C_{12-22}$alkyl or $C_{12-22}$alkenyl;
   $R_2$ is hydrogen or $-SO_3M$;
   m is 2, 3 or 4;
   n is 2, 3 or 4;
   $p+p'$ is 10 to 30 inclusive, each of p and p' being at least 1;
   and M is a cation; and
   (c) 5 to 40 % by weight of a dispersing agent which is a condensation product of ditolylether sulphonate and formaldehyde or of naphthalene sulphonic acid and formaldehyde or is a lignin sulphonate or a oxylignin sulphonate,
   said percentages being based on the dry weight of the total composition.

2. A composition according to claim 1, in which $R_1$ is $C_{18-22}$alkyl or $C_{18-22}$alkenyl.

3. A composition according to claim 1 further including:
   (d) 0.1 to 30 % of one or more compounds selected from a wetting agent, a sequestering agent, a defoamer and a dust suppressing agent.

4. A composition according to claim 1 in which component a) is a metal complex azo dyestuff with only one water soluble group present.

5. A composition according to claim 1 comprising:
   (a) 50 to 80 % by weight of one or more 1:2-chromium-, -cobalt-or -nickel complex azo dyes.
   (b) 2 to 10 % by weight of a compound of formula I, in which $R_1$ is $C_{18-22}$alkyl or $C_{18-22}$alkenyl, $R_2$ signifies a radical of formula $-SO_3M$, M is an ammonium ion, the sum of $p+p'$ is 15 to 25 and m and n respectively are 2; and
   (c) 10 to 30 % by weight of a dispersing agent.

6. A textile or leather substrate to which a composition according to claim 1 has been applied.

7. A composition according to claim 4 wherein M is ammonium or an alkali or alkaline earth metal ion.

8. A composition according to claim 4 wherein $R_1$ is $C_{18-22}$alkyl or $C_{18-22}$alkenyl and M is ammonium or an alkali metal ion.

9. A composition according to claim 1 in the dry form.

10. A composition according to claim 1 in the form of powder or granules.

11. A composition according to claim 7 in dry form.

12. A composition according to claim 8 in the form of powder or granules.

13. A composition in the form of powder or granules comprising:
    (a) 30 to 90 % by weight of one or more water-soluble anionic dyestuffs in metal complex form,
    (b) 0.5 to 20 % by weight of one or more compounds of formula I $$R_1-N\begin{matrix}(C_mH_{2m}O)_p-SO_3M\\(C_nH_{2n}O)_{p'}-R_2\end{matrix} \quad (I)$$

in which $R_1$ is $C_{12-22}$alkyl or $C_{12-22}$alkenyl;
    $R_2$ is hydrogen or $-SO_3M$;
    m is 2, 3 or 4;
    n is 2, 3 or 4;
    $p+p'$ is 10 to 30 inclusive, each of p and p' being at least 1;
    and M is a cation; and
    (c) 5 to 40 % by weight of a dispersing agent.

14. A composition according to claim 13 in which component a) is a metal complex azo dyestuff with only one water-soluble group present.

15. A composition according to claim 14 wherein M is ammonium or an alkali or alkaline earth metal ion.

16. A composition according to claim 15 comprising:
(a) 50 to 80 % by weight of one or more 1:2-chromium-, -cobalt- or -nickel complex azo dyes,
(b) 2 to 10 % by weight of a compound of formula I, in which $R_1$ is $C_{18-22}$alkyl or $C_{18-22}$alkenyl, $R_2$ signifies a radical of formula $-SO_3M$, M is an ammonium ion, the sum of $p+p'$ is 15 to 25 and m and n, respectively, are 2; and
(c) 10 to 30 % by weight of a dispersing agent.

17. A composition comprising:
(a) 30 to 90 % of one or more water-soluble anionic dyestuffs in metal complex form,
(b) 0.5 to 20 % of one or more compounds of formula I $$R_1-N\begin{matrix}(C_mH_{2m}O)_{\overline{p}}-SO_3M\\ (C_nH_{2n}O)_{\overline{p'}}-R_2\end{matrix} \quad (I)$$

in which $R_1$ is $C_{12-22}$alkyl or $C_{12-22}$alkenyl;
$R_2$ is hydrogen or $-SO_3M$,
m is 2, 3 or 4;
n is 2, 3 or 4;
$p+p'$ is 10 to 30 inclusive, each of p and p' being at least 1;
and M is a cation; and
(c) 5 to 40 % of a dispersing agent; and water sufficient to form a presscake or a liquid composition, said percentages being based on the dry weight of the total composition.

18. A composition according to claim 17 in which component a) is a metal complex azo dyestuff with only one water-soluble group present.

19. A composition according to claim 17 in which component c) is a condensation product of ditolylether sulphonate and formaldehyde or naphthalene sulphonic acid and formaldehyde or is a lignin sulphonate or an oxylignin sulphonate.

20. A composition according to claim 18 wherein M is ammonium or an alkali or alkaline earth metal ion.

21. A composition according to claim 19 wherein $R_1$ is $C_{18-22}$alkyl or $C_{18-22}$alkenyl and M is ammonium or an alkali metal ion.

22. A composition according to claim 19 comprising:
(a) 50 to 80 % by dry weight of one or more 1:2-chromium-, -cobalt- or -nickel complex azo dyes,
(b) 2 to 10 % by dry weight of a compound of formula I, in which $R_1$ is $C_{18-22}$alkyl or $C_{18-22}$alkenyl, $R_2$ signifies a radical of formula $-SO_3M$, M is an ammonium ion, the sum of $p+p'$ is 15 to 25 and m and n, respectively, are 2; and
(c) 10 to 30 % by dry weight of a dispersing agent.

23. A process for preparing a composition according to claim 13 comprising dissolving components b) and c) in water, adding component a), grinding the mixture and removing the water.

24. A process for preparing a composition according to claim 17 comprising dissolving components b) and c) in water, adding component a), grinding the mixture and diluting the mixture with water.

* * * * *